US007242065B2

United States Patent
Kondo et al.

(10) Patent No.: US 7,242,065 B2
(45) Date of Patent: Jul. 10, 2007

(54) COMPACT PRESSURE SENSOR WITH HIGH CORROSION RESISTANCE AND HIGH ACCURACY

(75) Inventors: Ichiharu Kondo, Aichi-ken (JP); Hiroaki Tanaka, Kariya (JP); Inao Toyoda, Anjo (JP); Makoto Totani, Kariya (JP)

(73) Assignee: DENSO CORPORATION, Kariya (JP)

( * ) Notice: Subject to any disclaimer, the term of this patent is extended or adjusted under 35 U.S.C. 154(b) by 97 days.

(21) Appl. No.: 11/081,525

(22) Filed: Mar. 17, 2005

(65) Prior Publication Data

US 2005/0205950 A1    Sep. 22, 2005

(30) Foreign Application Priority Data

Mar. 19, 2004   (JP)   ............................ 2004-081681

(51) Int. Cl.
*H01L 29/84* (2006.01)
*G01L 9/00* (2006.01)

(52) U.S. Cl. ...................................... 257/415; 73/754

(58) Field of Classification Search ................. 73/715, 73/754; 257/415
See application file for complete search history.

(56) References Cited

U.S. PATENT DOCUMENTS

| 5,595,939 | A | 1/1997 | Otake et al. |
| 6,282,966 | B1* | 9/2001 | Probst et al. ................. 73/715 |
| 6,303,873 | B1* | 10/2001 | Mori et al. ................. 174/260 |
| 2003/0030542 | A1* | 2/2003 | von Hoffmann ........... 340/5.61 |
| 2003/0200813 | A1* | 10/2003 | Baba et al. .................... 73/715 |

FOREIGN PATENT DOCUMENTS

JP   7-243926   9/1995

* cited by examiner

*Primary Examiner*—Sara Crane
*Assistant Examiner*—Colleen Matthews
(74) *Attorney, Agent, or Firm*—Posz Law Group, PLC

(57) ABSTRACT

A pressure sensor includes a sensor chip and a circuit chip. The sensor chip, which is configured to generate an electrical signal representative of a pressure being sensed, has a surface including a sensing area and a plurality of electrical contact pads disposed on the surface. The circuit chip includes a circuit configured to process the electrical signal and has a surface on which a plurality of electrical contact pads of the circuit chip are disposed. The circuit chip is joined to the sensor chip so that the electrical contact pads of the circuit chip are respectively electrically connected to those of the sensor chip, all the electrical contact pads of the circuit chip and the sensor chip are hermetically sealed and isolated from the fluid, and the surfaces of the circuit chip and the sensor chip face each other with the electrical contact pads of the same interposed therebetween.

12 Claims, 6 Drawing Sheets

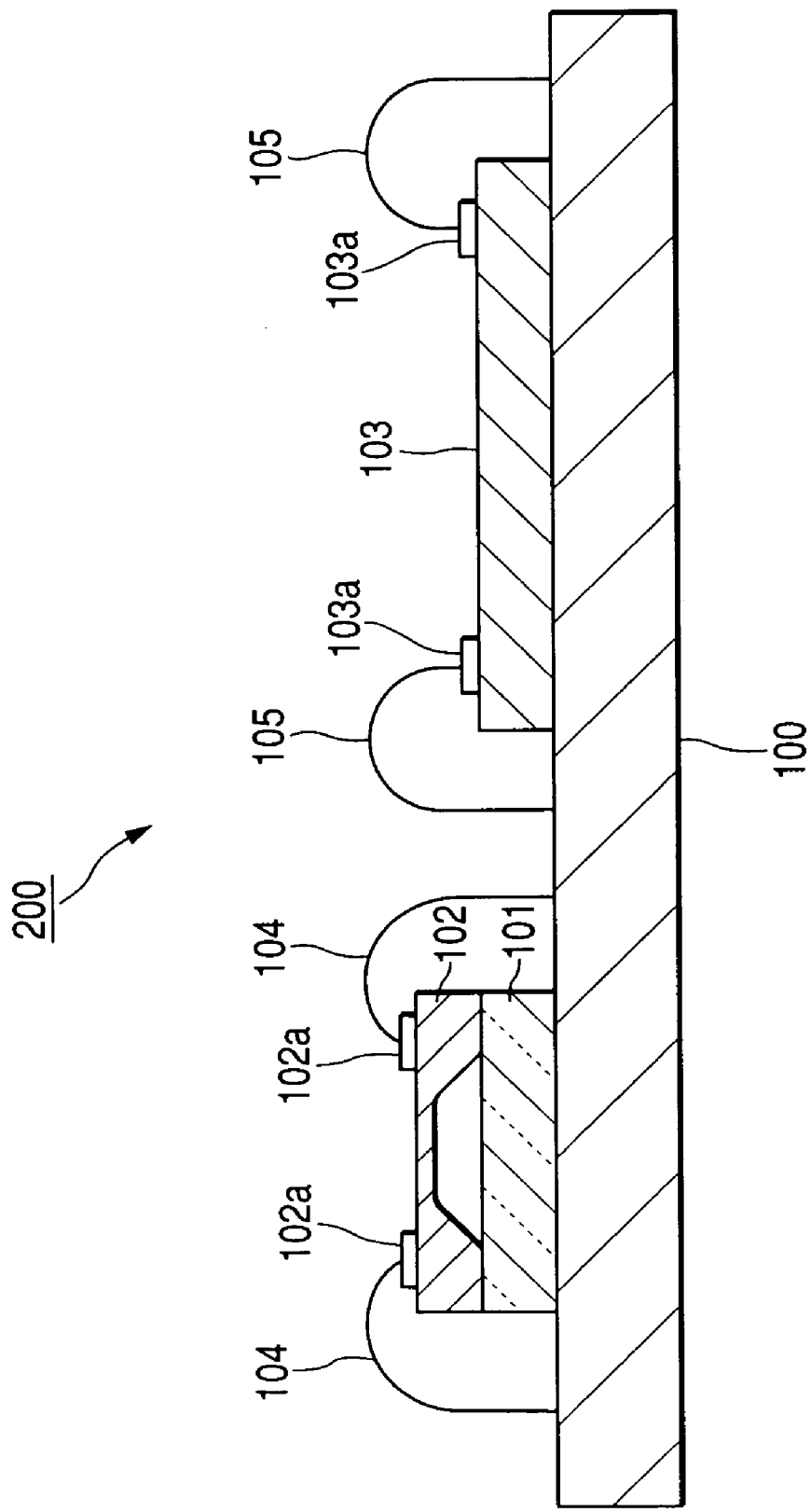

COMPACT PRESSURE SENSOR WITH HIGH CORROSION RESISTANCE AND HIGH ACCURACY

CROSS-REFERENCE TO RELATED APPLICATION

This application claims priority from Japanese Patent Application No. 2004-81681, filed on Mar. 19, 2004, the content of which is hereby incorporated by reference into this application.

BACKGROUND OF THE INVENTION

1. Technical Field of the Invention

The present invention relates generally to pressure sensors. More particularly, the invention relates to an improved pressure sensor that has a compact size and high corrosion resistance and ensures high accuracy in sensing a pressure.

2. Description of the Related Art

Conventionally, wire bonding has been used to make an electrical connection for a pressure sensor.

For example, as shown in FIG. 8, a pressure sensor 200 includes a sensor chip 102, an integrated circuit chip 103, and a substrate 100.

The sensor chip 102 is configured to sense a pressure of a fluid and generate an electrical signal representative of the sensed pressure. The sensor chip 102 is joined to the upper surface of a glass seat 101, and disposed on the substrate 100 together with the glass seat 101.

The circuit chip 103 includes a circuit that is configured to process (e.g., amplify) the electrical signal generated by the circuit chip 102, and also disposed on the substrate 100.

In the above pressure sensor 200, wire bonding is used to make an electrical connection between the different members of the pressure sensor. Specifically, the sensor chip 102 has a plurality of electrical contact pads 102a that are made of aluminum and electrically connected to the substrate 100 by wire bonding 104; the circuit chip 103 has a plurality of electrical contact pads 103a that are also made of aluminum and electrically connected to the substrate 100 by wire bonding 105. As a result, the sensor chip 102 and the circuit chip 103 are electrically connected with each other.

However, in the above arrangement, the electrical contact pads 102a and 103a of the sensor chip 102 and the circuit chip 103 are to be exposed to an environment around the pressure sensor 200. When the environment is a corrosive one, for example, an acidic atmosphere, those electrical contact pads will be corroded accordingly, thereby resulting in an electrical connection failure.

As an alternative, Japanese Patent No. 3,198,779, an English equivalent of which is U.S. Pat. No. 5,595,939, discloses a pressure sensor that is configured to sense a pressure of a highly corrosive fluid.

According to the disclosure, the pressure sensor has a structure in which a sensing element is connected to connector pins by wire bonding, and all the sensing element, bonding wires, and connector pins are placed in oil and sealed by means of a corrosive resistant metal diaphragm.

However, with such a structure, the pressure sensor necessarily includes the metal diaphragm, the oil, an O-ring for sealing, etc., thus resulting in great difficulty in making the pressure sensor compact.

SUMMARY OF THE INVENTION

The present invention has been made in view of the above-mentioned problem.

It is, therefore, a primary object of the present invention to provide an improved pressure sensor that has a compact size and high corrosion resistance and ensures high accuracy in sensing a pressure.

According to the present invention, a pressure sensor is provided which includes:

a sensor chip configured to sense a pressure of a fluid and generate an electrical signal representative of the sensed pressure, the sensor chip having a surface that includes a sensing area to be exposed to the fluid and a plurality of electrical contact pads that are disposed on the surface of the sensor chip; and a circuit chip including a circuit that is configured to process the electrical signal generated by the sensor chip and having a surface on which a plurality of electrical contact pads of the circuit chip are disposed, the circuit chip being joined to the sensor chip so that the electrical contact pads of the circuit chip are respectively electrically connected to those of the sensor chip, wherein all the electrical contact pads of the circuit chip and the sensor chip are hermetically sealed so as to be isolated from the fluid, and the surfaces of the circuit chip and the sensor chip face each other with the electrical contact pads of the same interposed therebetween.

With such a structure, when the pressure sensor is used in a corrosive environment, it is possible to prevent the pressure sensor from being corroded.

Moreover, since the sensor chip is superposed on the circuit chip, the pressure sensor is accordingly made compact.

In a preferred embodiment of the invention, the pressure sensor further includes a substrate. The substrate includes a resin sheet that has an opening formed therethrough and a plurality of electrical conductors that are arranged within the resin sheet.

The substrate is joined to both the sensor chip and the circuit chip so that the substrate is interposed between the surfaces of the sensor chip and the circuit chip, and the sensing area of the surface of the sensor chip is to be exposed to the fluid through the opening of the resin sheet of the substrate. At the same time, the electrical contact pads of the circuit chip are respectively electrically connected to those of the sensor chip through the electrical conductors of the substrate, and all the electrical contact pads of the circuit chip and the sensor chip and the electrical conductors of the substrate are hermetically sealed within the resin sheet of the substrate so as to be isolated from the fluid.

Since the substrate includes the electrical conductors that are arranged within the resin sheet, the pressure sensor is accordingly made compact without the wire bonding that otherwise may be necessary for making electrical connection for the pressure sensor.

Moreover, the sensing area of the surface of the sensor chip is to be reliably exposed to the fluid through the opening of the resin sheet of the substrate, thus ensuring high sensitivity and accuracy of the pressure sensor.

It is preferable that the resin sheet of the substrate further has a plurality of via holes formed therein, and the electrical contact pads of the sensor chip and the circuit chip are respectively electrically connected to the electrical conductors of the substrate through the via holes.

With such via holes, it becomes easy to make the electrical connection between the electrical contact pads of the sensor chip and the circuit chip and the electrical conductors of the substrate.

It is also preferable that the resin sheet of the substrate has thermoplasticity, so that the substrate can be easily joined to both the senor chip and the circuit chip by thermal press fitting.

In another preferred embodiment of the invention, the electrical contact pads of the circuit chip are respectively joined and electrically connected to those of the sensor chip through an anisotropic conductive adhesive. At the same time, all the electrical contact pads of the circuit chip and the sensor chip are hermetically sealed with an insulative adhesive so as to be isolated from the fluid, leaving the sensing area of the surface of the sensor chip to be exposed to the fluid.

Accordingly, the pressure sensor according to the present invention has a compact size and high corrosion resistance and ensures high accuracy in sensing a pressure.

It should be noted that the pressure sensor according to the invention is especially suitable for use in sensing a pressure of the exhaust gas from an engine. More particularly, the pressure sensor is configured to be operable in an environment where exposed to condensed water around the engine which has a pH of 4 or less.

BRIEF DESCRIPTION OF THE DRAWINGS

The present invention will be understood more fully from the detailed description given hereinafter and from the accompanying drawings of the preferred embodiments of the invention, which, however, should not be taken to limit the invention to the specific embodiments but are for the purpose of explanation and understanding only.

In the accompanying drawings:

FIG. 8 is a cross-sectional side view showing a prior art pressure sensor.

DESCRIPTION OF THE PREFERRED EMBODIMENTS

Figure 1:
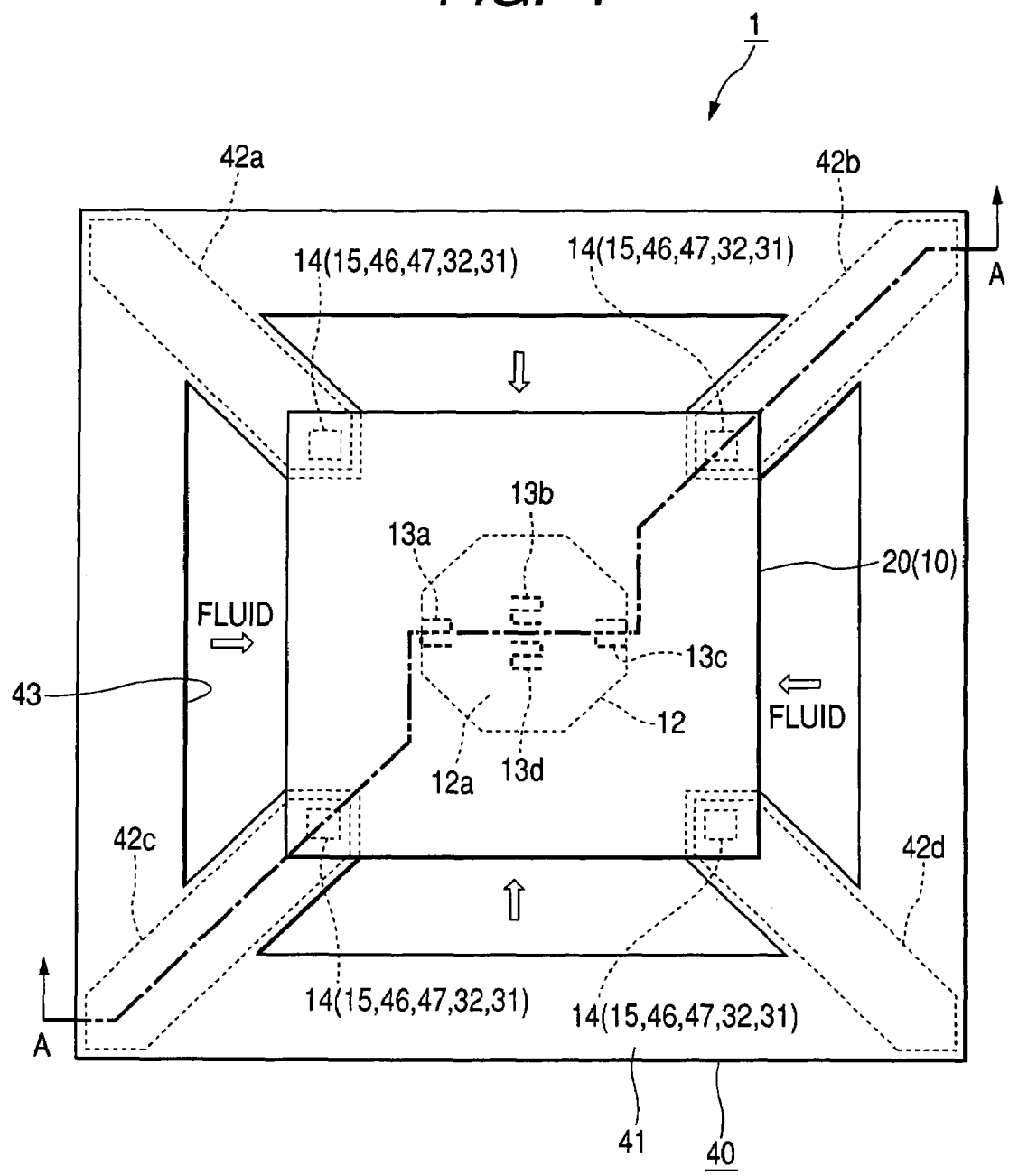
FIG. 1 is a top plan view showing a pressure sensor according to the first embodiment of the invention.

The preferred embodiments of the present invention will be described hereinafter with reference to FIGS. 1–7.

It should be noted that, for the sake of clarity and understanding, identical components having identical functions in different embodiments of the invention have been marked, where possible, with the same reference numerals in each of the figures.

First Embodiment

Figure 2:
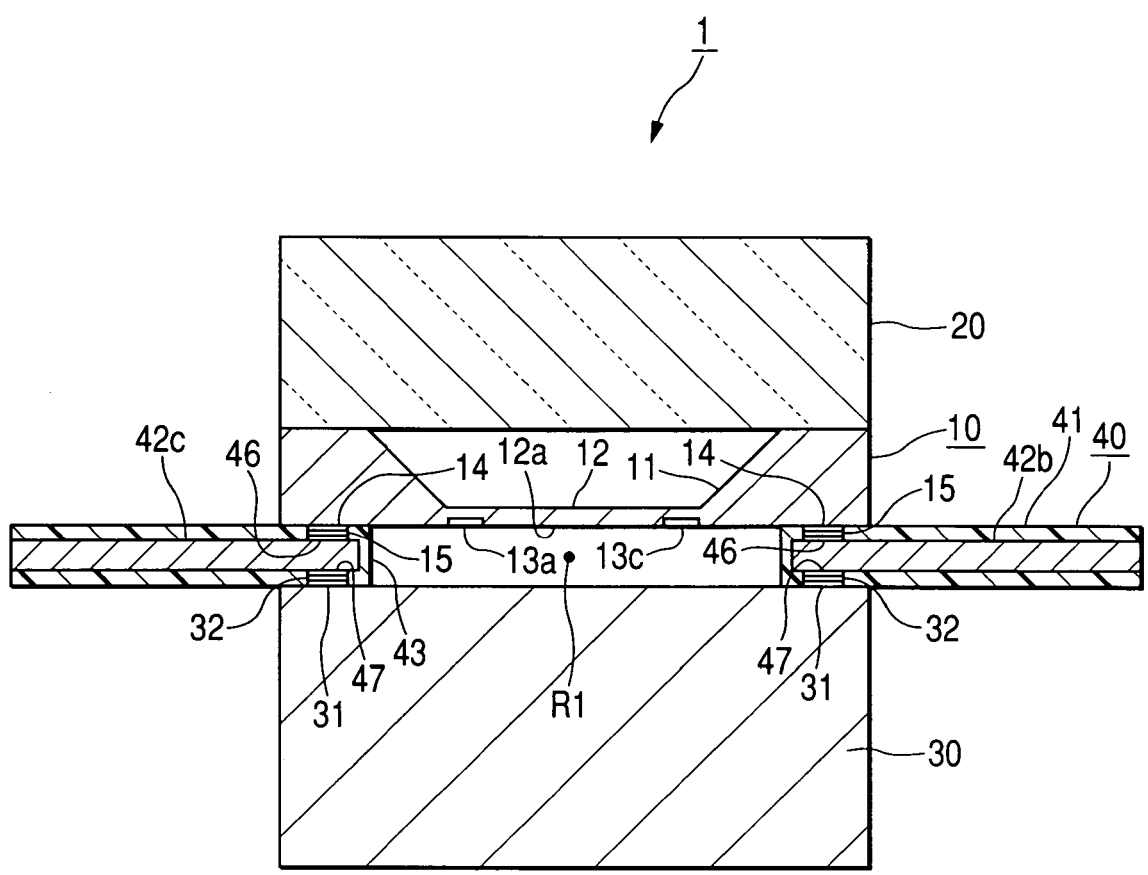
FIG. 2 is a cross-sectional side view taken along a line A—A of FIG. 1.

FIGS. 1–2 show a pressure sensor 1 according to the first embodiment of the invention.

The pressure sensor 1 is configured to sense a pressure of the exhaust gas from an engine of a vehicle. In other words, the fluid, the pressure of which is to be sensed by the pressure sensor 1, is an exhaust gas.

More specifically, the pressure sensor 1 is to be used to measure a pressure on an Exhaust Gas Recirculation (EGR) path in an EGR system of the vehicle.

When the pressure sensor 1 is used to sense such a pressure, condensed water formed around the engine inevitably contains gas components, particularly acidic gas components, from the exhaust gas and generally has a pH of 4 or less. In other words, the pressure sensor 1 is to be used in a corrosive environment in which the pH is 4 or less.

As shown in FIGS. 1–2, the pressure sensor 1 mainly includes a sensor chip (or sensor element) 10, a circuit chip 30, and a substrate 40. The sensor chip 10 is superposed on the circuit chip 30, with the substrate 40 interposed therebetween.

Figure 3A:
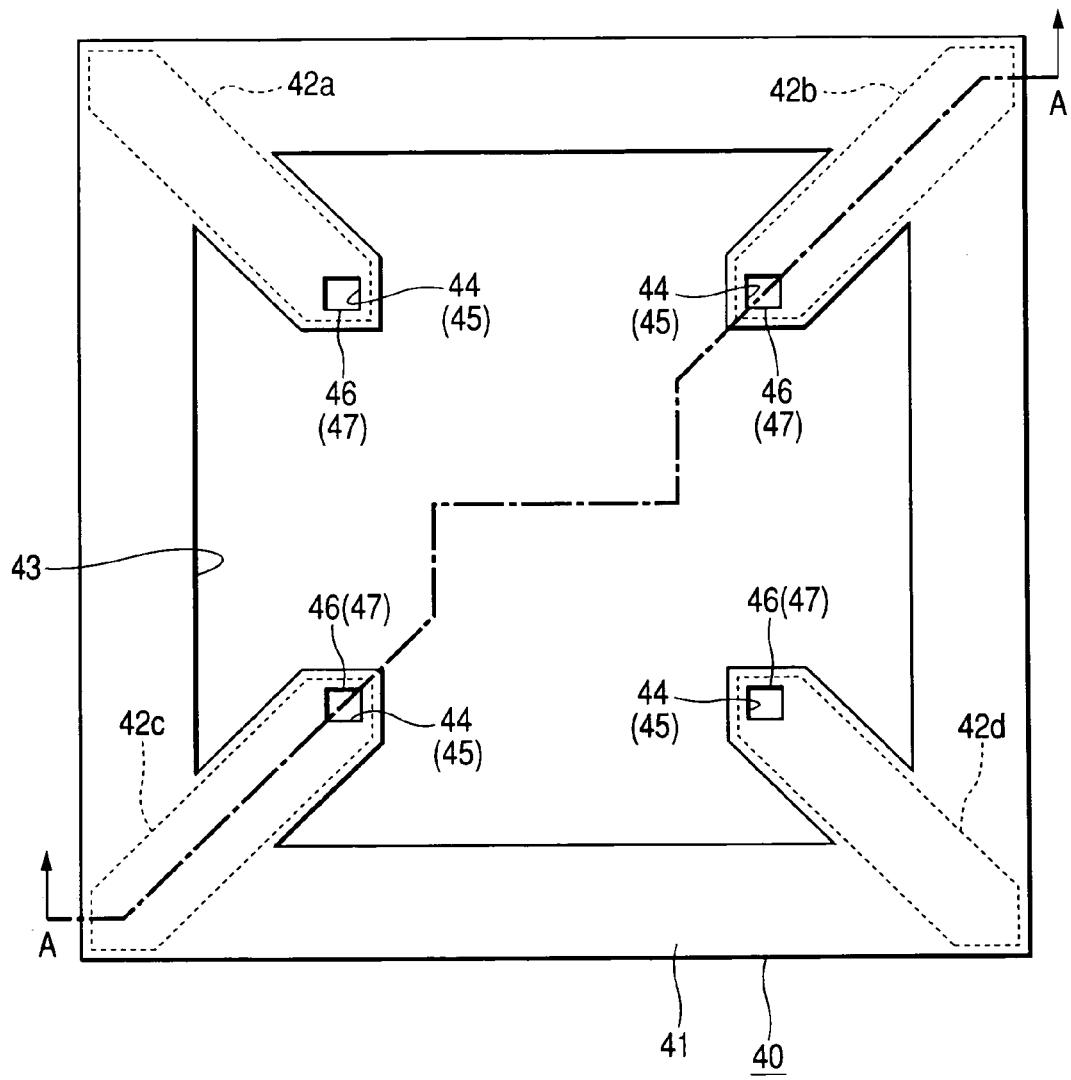
FIG. 3A is a top plan view showing a substrate of the pressure sensor of FIG. 1.
Figure 3B:
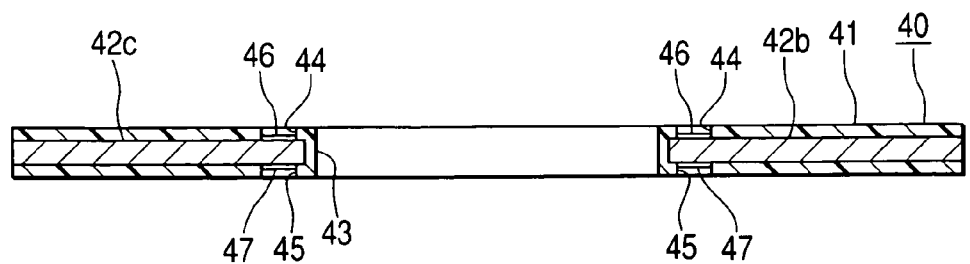
FIG. 3B is a cross-sectional side view taken along a line A—A of FIG. 3A.

The substrate 40 is shown in more detail in FIGS. 3A–3B without the sensor chip 10 and the circuit chip 30 joined thereto.

Figure 4:
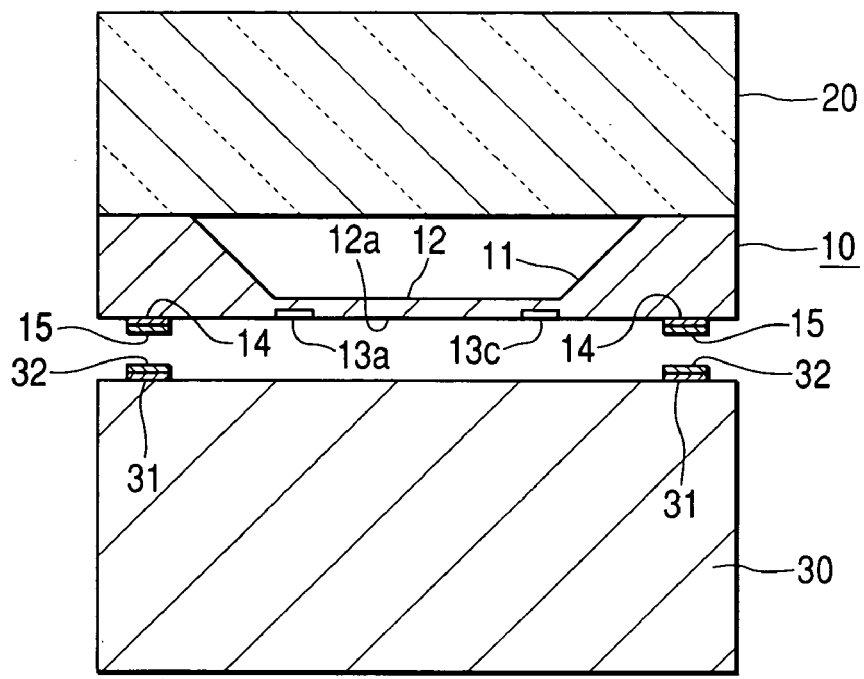
FIG. 4 is a cross-sectional side view showing all the members of the pressure sensor of FIG. 1 except for the substrate of the same.

On the contrary, FIG. 4 shows all the members of the pressure sensor 1 except for the substrate 40.

As shown in FIGS. 1 and 4, the sensor chip 10, which is made of a silicon material, is shaped in a rectangular plate and has a recess 11 that is centrally formed on the upper surface of the sensor chip 10 and opens upwardly in the FIG. 4. With the help of the recess 11, a diaphragm 12 is obtained in the sensor chip 10.

Specifically, the bottom face of the recess 11, which has an octagonal shape as indicated with a dashed line in FIG. 1, and a sensing area 12a of the under surface of the sensor chip 10 together constitute the diaphragm 12. Since the upper surface of the sensor chip 10 is joined to the under surface of a glass seat 20 as shown in FIG. 4, the recess 11 and the under surface of the glass seat 20 together form a closed reference pressure (e.g., vacuum) chamber.

On the other hand, the sensing area 12a of the under surface of the sensor chip 10 is to be exposed to a pressure being sensed. As shown in FIGS. 1 and 4, on the sensing area 12a, there are provided four gauges (or piezoresistors) 13a–13d that are impurity diffused layers formed on the surface of the sensor chip 10. More specifically, in this embodiment, the gauges 13a–13d are formed by doping a p-type dopant into an n-type silicon substrate. Further, those gauges 13a–13d together form a bridge circuit in the sensor chip 10.

When a pressure is applied to the sensing area 12a of the under surface of the sensor chip 10, the difference in pressure between the two opposite surfaces of the diaphragm 12 (i.e., the sensing area 12a and the bottom face of the recess 11) induces a stress change in the diaphragm 12. This stress change causes the electrical resistances of the gauges 13a–13d to change due to the piezoresistive effect that those gauges 13a–13d have. Then, the bridge circuit detects the changes in the electrical resistances of the gauges 13a–13d, thereby generating an electrical signal that is representative of the pressure applied to the sensing area 12a.

The sensor chip 10 includes, as shown in FIGS. 1 and 4, four electrical contact pads 14 that are made of an aluminum film and respectively disposed in four corners of the rectangular under surface of the sensor chip 10. Through those electrical contact pads 14, the bridge circuit formed in the sensor chip 10 is supplied with electrical power, and the electrical signal generated by the bridge circuit is outputted to an external (e.g., an external circuit or device). On each of the electrical contact pads 14, a Nickel (Ni) film and a gold (Au) film are plated in turn, thereby forming a Ni—Au lamination 15 that allows making electrical connection for the electrical contact pad 14 by soldering.

Thus, the sensor chip 10 has the diaphragm 12 formed therein so as to generate the electrical signal representative of the pressure being sensed. The sensor chip 10 also has the under surface that includes the sensing area 12a to be exposed to the pressure being sensed and the electrical contact pads 14 disposed on the under surface.

On the other hand, the circuit chip 30 includes various devices, by which at least one circuit that is configured to process (e.g., amplify) the electrical signal generated by the sensor chip 10 is formed in the circuit chip 30.

As shown in FIGS. 1 and 4, the circuit chip 30 has the shape of a rectangular plate and includes four electrical contact pads 31 that are made of an aluminum film and disposed in four corners of the rectangular upper surface of the circuit chip 30. It should be noted that, the upper surface of the circuit chip 30 is coated with a corrosion-proof film except for those areas thereof on which the electrical contact pads 31 are arranged.

Through the electrical contact pads 31, the electrical signal generated by the sensor chip 10 is to be provided to the circuit chip 30. On each of the electrical contact pads 31, a Ni film and a Au film are plated in turn, thereby forming a Ni—Au lamination 32 that allows making electrical connection for the electrical contact pad 31 by soldering.

Thus, the circuit chip 30 includes the circuit configured to process the electrical signal generated by the sensor chip 10 and has the upper surface on which the electrical contact pads 31 are disposed.

Referring back to FIGS. 3A–3B, the substrate 40 also has the shape of a rectangular plate. The substrate 40 includes a resin sheet 41, which has thermoplasticity and electrical insulating properties, and a plurality of electrical conductors 42a–42d that are arranged within the resin sheet 41.

The resin sheet 41 may be made, for example, of PEEK (polyetherether ketone), PEI (polyether imide), PPS (polyphenylene sulfide), PBT (polybutylene terephthalate), PET (polyethylene terephthalate), PEN (polyethylene naphthalate), and LCP (liquid crystal polymer), or a mixture thereof.

The electrical conductors 42a–42d may be made, for example, of Cu. As shown in FIG. 3A, the electrical conductors 42a–42d each have the shape of a band plate and extend radially from a central area of the rectangular resin sheet 41 to one corner of the same.

Further, the resin sheet 41 has an opening 43 that is centrally formed through the resin sheet 41. The opening 43 has, as show in FIG. 3A, a cross section that is substantially rectangle-shaped except for the four corners thereof that are occupied by four protruding portions of the resin sheet 41; in each of the protruding portions, one of the electrical conductors 42a–42d extends respectively.

As shown in FIG. 1, the cross section of the opening 43 is greater than those of the sensor chip 10 and the circuit chip 30, so that the fluid, the pressure of which is to be sensed by the pressure sensor 1, can flow into the space between the two chips 10 and 30 as indicated by the bold arrows in the figure. As a result, the sensing area 12a of the sensor chip 10 can be exposed to the fluid, thereby sensing the pressure of the fluid.

Furthermore, as shown in FIGS. 3A–3B, the resin sheet 41 has a plurality of via holes 44 and 45, each of which is formed in the resin sheet 41 at the inner end of one of the protruding portions of the resin sheet 41. Through the via holes 44, the upper surfaces of the inner ends of the electrical conductors 42a–42d are exposed; through the via holes 45, the under surfaces of the same are also exposed. Those via holes 44 and 45 are provided for making electrical connection for the pressure sensor 1. On the upper and under surfaces of the inner end of each of the electrical conductors 42a–42d, a Cu film 46 and 47 are respectively plated.

Thus, the substrate 40 is configured to have the electrical conductors 42a–42d arranged within the resin sheet 41 and the opening 43 through which the sensing area 12a of the sensor chip 10 is to be exposed to the pressure being sensed.

The substrate 40 is interposed between the sensor chip 10 and the circuit chip 30, and joined to both the chips 10 and 30 by thermal press fitting, thereby forming the pressure sensor 1 according to the present embodiment as shown in FIGS. 1–2.

At the same time, the sensor chip 10 is superposed on the circuit chip 30, so that the under surface of the sensor chip 10 faces the upper surface of the circuit chip 30, and each of the electrical contact pads 14 of the sensor chip 10 is in opposed relationship with one of the electrical contact pads 31 of the circuit chip 30. Further, the electrical conductors 42a–42d of the substrate 40, which is interposed between the sensor chip 10 and the circuit chip 30, are respectively joined to the electrical contact pads 14 of the sensor chip 10 and the electrical contact pads 31 of the circuit chip 30 by soldering.

Specifically, solder paste was first applied to all the upper and under surfaces of inner ends of the electrical conductors 42a–42d of the substrate 40 through the via holes 44 and 45 formed in the resin sheet 41.

Then, the substrate 40 was placed between the under surface of the sensor chip 10 and the upper surface of the circuit chip 30, and joined to both the chips 10 and 30 by thermal press fitting at a temperature of 300° C.

During the thermal press fitting, the solder paste was melted by the heat transferred thereto, thereby joining the upper surfaces of inner ends of the electrical conductors 42a–42d of the substrate 40 to the electrical contact pads 14 of the sensor chip 10 and the under surfaces of the same to the electrical contact pads 31 of the circuit chip 30. As a result, all the joining portions between the electrical conductors 42a–42d and the electrical contact pads 14 and between the electrical conductors 42a–42d and the electrical contact pads 31 are hermetically sealed within the resin sheet 41, thereby being isolated from the environment around the pressure sensor 1.

At the same time, the sensing area 12a of the under surface of the sensor chip 10 is exposed to the environment through the opening 43 of the resin sheet 41. More specifically, as shown in FIGS. 1–2, the fluid is to flow, through the opening 43, into the space R1 between the under surface of the sensor chip 10 and the upper surface of the circuit chip 30, so that the sensing area 12a of the under surface of the sensor chip 10 is exposed to the fluid.

As described previously, the sensor chip 10 includes the bridge circuit that is formed by the gauges 13a–13d shown in FIG. 1. The bridge circuit is supplied with electrical power through two of the electrical contact pads 14 of the sensor chip 10, while the electrical signal generated by the bridge circuit is outputted from the sensor chip 10 through the other two of the electrical contact pads 14.

Moreover, the electrical contact pads 14 of the sensor chip 10 are respectively electrically connected to the electrical contact pads 31 of the circuit chip 30 through the electrical conductors 42a–42d of the substrate 40.

Among the four electrical conductors 42a–42d of the substrate 40, two are used to supply electrical power to the pressure sensor 1. For example, 42b is connected to ground, while 42c is connected to an outer power source. On the other hand, the other two of the electrical conductors 42a–42d are used to output the electrical signal generated by the bridge circuit of the sensor chip 10. For example, through 42a and 42d, the electrical signal is outputted from the sensor chip 10 to the circuit chip 30 and the external; the circuit chip 30 then processes (e.g., amplifies or compensates for temperature-induced errors) the electrical signal by the electrical circuit included therein and outputs the processed electrical signal to the external through electrical terminals thereof (not shown).

Figure 5:
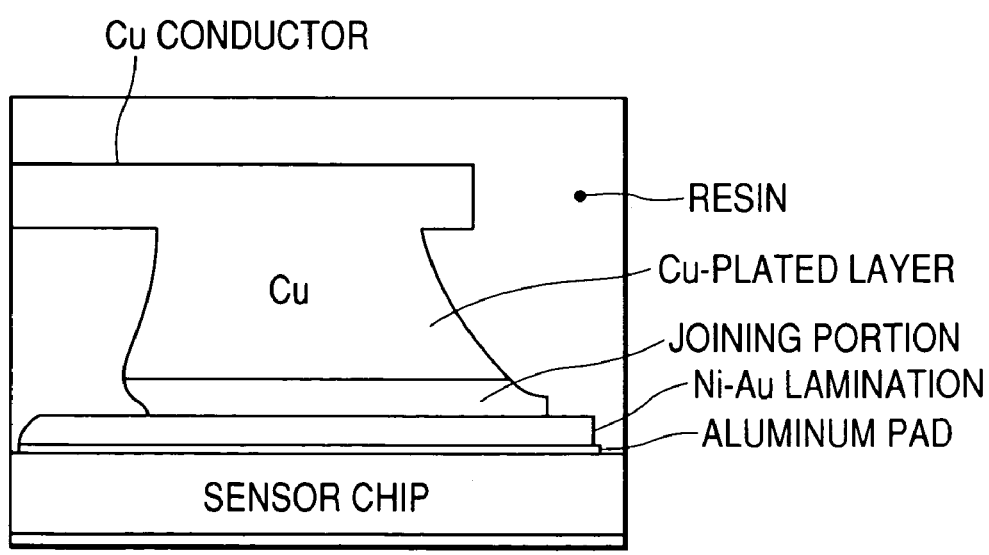
FIG. 5 is a pattern diagram showing the joining portion between an electrical contact pad of a sensor chip and an electrical conductor of the substrate in the pressure sensor of FIG. 1.

FIG. 5 shows a pattern diagram of the joining portion between an electrical contact pad 14 of the sensor chip 10 and one of the electrical conductors 42a–42d of the substrate 40; the pattern diagram is obtained through microscopic examination of the joining portion.

It can be seen from FIG. 5 that the Ni—Au lamination 15, which is formed on the aluminum contact pad 14 of the sensor chip 10, is joined well, through the joining portion (i.e., solder layer), to the Cu-plated layer 46 that is formed on the Cu conductor of the substrate 40.

To sum up, the pressure sensor 1 according to the present embodiment includes the sensor chip 10, the circuit chip 30, and the substrate 40.

The sensor chip 10 is configured to sense a pressure of a fluid (i.e., the exhaust gas from an engine) and generate an electrical signal representative of the sensed pressure. The sensor chip 10 has an under surface that includes the sensing area 12a to be exposed to the fluid and the electrical contact pads 14 that are disposed on the under surface of the sensor chip 10.

The circuit chip 30 includes the circuit that is configured to process the electrical signal generated by the sensor chip 10 and has the upper surface on which the electrical contact pads 31 of the circuit chip 30 are disposed.

The substrate 40 includes the resin sheet 41 having the opening 43 formed therethrough and the electrical conductors 42a–42d arranged within the resin sheet 41.

The substrate 40 is joined, by thermal press fitting, to both the sensor chip 10 and the circuit chip 30, so that the substrate 40 is interposed between the two chips 10 and 30, and the sensing area 12a of the under surface of the sensor chip 10 is to be exposed to the fluid through the opening 43 of the resin sheet 41 of the substrate 40. At the same time, the electrical contact pads 14 of the sensor chip 10 are respectively electrically connected to the electrical contact pads 31 of the circuit chip 30 through the electrical conductors 42a–42d of the substrate 40, and all the electrical contact pads 14 and 31 and the electrical conductors 42a–42d are hermetically sealed within the resin sheet 41 of the substrate 40 so as to be isolated from the fluid.

With such a structure, when the pressure sensor 1 is used in a corrosive environment, it is possible to prevent the pressure sensor 1 from being corroded.

Further, in the pressure sensor 1, the sensor chip 10 is superposed on the circuit chip 30, with the substrate 40 interposed therebetween. The substrate 40 has the electrical conductors 42a–42d arranged within the resin sheet 41, thereby omitting the wire bonding that otherwise may be necessary for making electrical connection for the pressure sensor 1. As a result, the pressure sensor 1 is accordingly made compact.

Furthermore, the sensing area 12a of the under surface of the sensor chip 10 is to be reliably exposed to the fluid through the opening 43 of the resin sheet 41 of the substrate 40, thus ensuring high sensitivity and accuracy of the pressure sensor 1.

Additionally, the resin sheet 41 of the substrate 40 further has the via holes 44 and 45 formed therein, through which the electrical contact pads 14 of the sensor chip 10 and the electrical contact pads 31 of the circuit chip 30 are respectively electrically connected to the electrical conductors 42a–42d of the substrate 40. With such via holes 44 and 45, it becomes easy to make the electrical connection between the electrical contact pads 14 and 31 and the electrical conductors 42a–42d.

Moreover, the resin sheet 41 of the substrate 40 has thermoplasticity, so that the substrate 40 could be easily joined to both the sensor chip 10 and the circuit chip 30 by thermal press fitting.

It should be noted that the pressure sensor 1 is especially suitable for use in sensing a pressure of the exhaust gas from an engine. More particularly, the pressure sensor 1 is configured to be operable in an environment where exposed to condensed water around the engine which has a pH of 4 or less.

Second Embodiment

Figure 6:
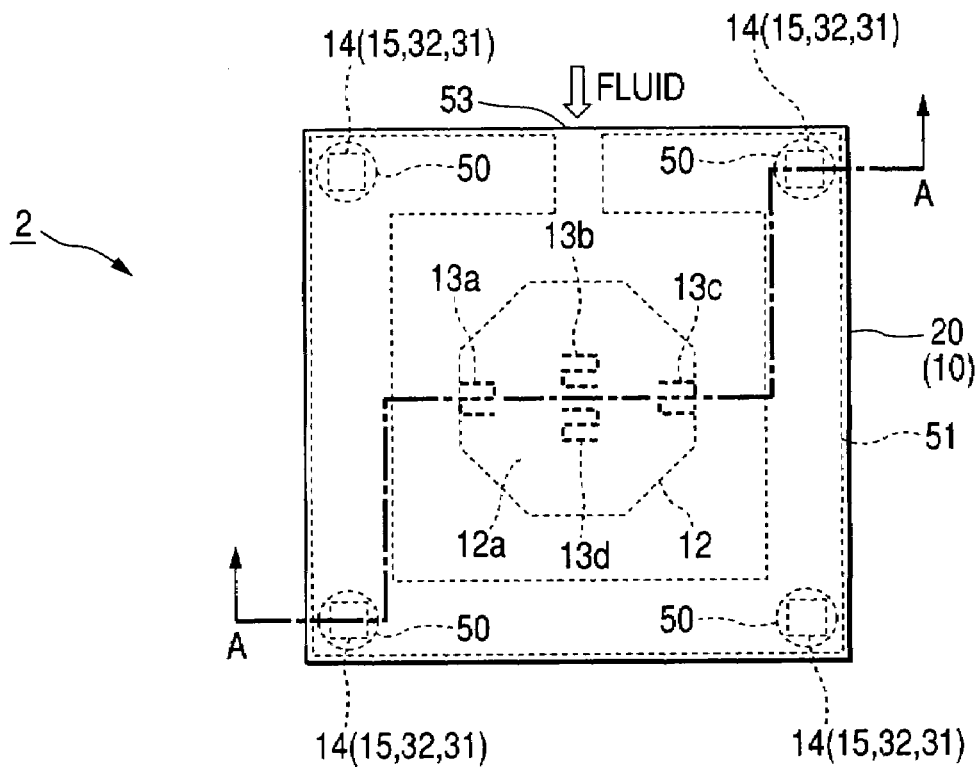
FIG. 6 is a top plan view showing a pressure sensor according to the second embodiment of the invention.
Figure 7:
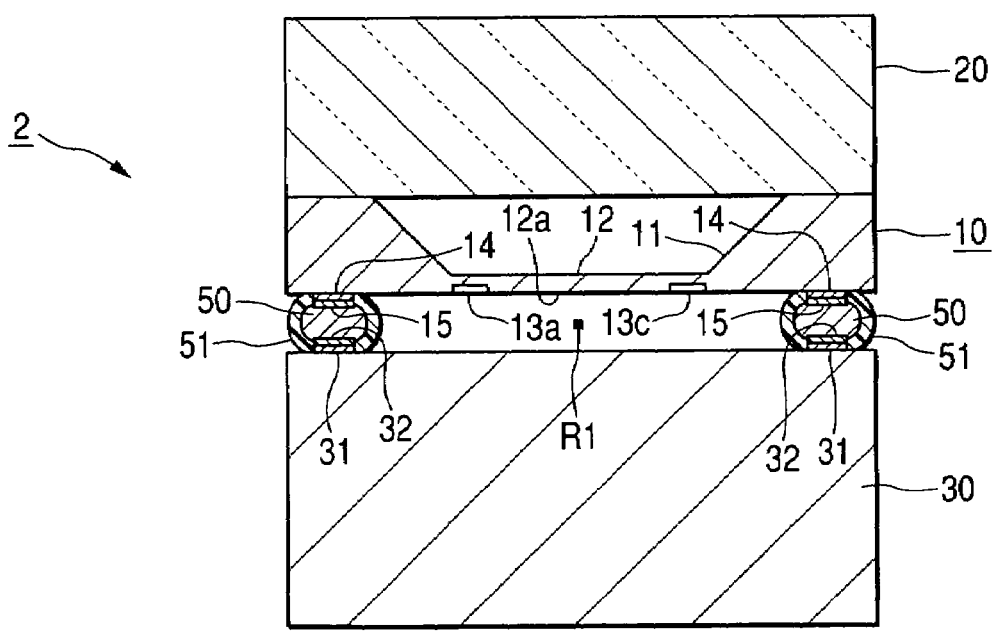
FIG. 7 is a cross-sectional side view taken along a line A—A of FIG. 6.

FIGS. 6–7 show a pressure sensor 2 according to the second embodiment of the invention.

The pressure sensor 2 is also configured to sense a pressure of the exhaust gas from an engine, and has a structure almost identical to that of the pressure sensor 1 according to the previous embodiment. Accordingly, the difference in structure between the pressure sensor 2 and the pressure sensor 1 is mainly described in the present embodiment.

In the previous embodiment, the pressure sensor 1 includes the sensor chip 10, the circuit chip 30, and the substrate 40. The substrate 40 includes the resin sheet 40 that has thermoplasticity, so that the sensor chip 10 could be joined to the circuit chip 30 through the substrate 40 by thermal press fitting.

However, in this embodiment, the pressure sensor 2 includes only the sensor chip 10 and the circuit chip 30, and the two chips 10 and 30 are joined together by adhesives instead of thermal press fitting.

Specifically, as shown in FIGS. 6–7, the sensor chip 10, which has the sensing area 12a and the electrical contact pads 14 on the under surface thereof, is superposed on the circuit chip 30 that has the electrical contact pads 31 on the upper surface thereof. The electrical contact pads 14 of the sensor chip 10 are respectively joined and thus electrically connected to the electrical contact pads 31 of the circuit chip 30 through an anisotropic conductive adhesive 50.

Further, the under surface of the sensor chip 10 and the upper surface of the circuit chip 30 are joined together with an insulative adhesive 51. The insulative adhesive 51 may be, for example, a resin adhesive in this embodiment.

The insulative adhesive 51 is applied, as shown in FIG. 6, along the outer periphery of the two surfaces, so that all the electrical contact pads 14 and 31 of the sensor chip 10 and the circuit chip 30 are hermetically sealed with the insulative adhesive 51, thereby being isolated from the fluid (i.e., the exhaust gas from an engine).

At the same time, there is provided an entrance 53 between the under surface of the sensor chip 10 and the upper surface of the circuit chip 30, thereby allowing the fluid being sensed to flow into the space between the two surfaces as indicated by the bold arrow in FIG. 6. The space between the two surfaces is designated by R1 in FIG. 7.

It should be noted that the circuit chip 30 of the pressure sensor 2 is further provided with electrical terminals (not shown) through which the pressure sensor 2 is supplied with electrical power and the electrical signal that is generated by the sensor chip 10 and processed by the circuit chip 30 is outputted to an external (e.g., an external circuit or device).

To sum up, the pressure sensor 2 according to the present embodiment includes the sensor chip 10 and the circuit chip 30.

The sensor chip 10 is configured to sense a pressure of a fluid (i.e., the exhaust gas from an engine) and generate an electrical signal representative of the sensed pressure. The sensor chip 10 has the under surface that includes the sensing area 12a to be exposed to the fluid and the electrical contact pads 14 that are disposed on the under surface of the sensor chip 10.

The circuit chip 30 includes the circuit that is configured to process the electrical signal generated by the sensor chip 10 and has the upper surface on which the electrical contact pads 31 of the circuit chip 30 are disposed.

The electrical contact pads 14 of the sensor chip 10 are respectively joined and thus electrically connected to the electrical contact pads 31 of the circuit chip 30 through the anisotropic conductive adhesive 50. Further, all the electrical contact pads 14 and 31 of the two chips 10 and 30 are hermetically sealed with the insulative adhesive 51, thereby being isolated from the fluid.

With such a structure, when the pressure sensor 2 is used in a corrosive environment, it is possible to prevent the pressure sensor 2 from being corroded.

Moreover, since the sensor chip 10 is superposed on the circuit chip 30, the pressure sensor 2 is accordingly made compact.

Furthermore, the sensing area 12a of the under surface of the sensor chip 10 is to be reliably exposed to the fluid through the entrance 53, thus ensuring high sensitivity and accuracy of the pressure sensor 2.

It should be noted that the pressure sensor 2 is especially suitable for use in sensing a pressure of the exhaust gas from an engine. More particularly, the pressure sensor 2 is configured to be operable in an environment where exposed to condensed water around the engine which has a pH of 4 or less.

While the above particular embodiments of the invention have been shown and described, it will be understood by those who practice the invention and those skilled in the art that various modifications, changes, and improvements may be made to the invention without departing from the spirit of the disclosed concept.

For example, in the previous embodiments of the invention, the pressure sensors 1 and 2 are configured to sense a pressure of the exhaust gas from an engine.

However, those pressure sensors 1 and 2 may also be configured to sense any other pressures, such as a pressure of oil.

Such modifications, changes, and improvements within the skill of the art are intended to be covered by the appended claims.

What is claimed is:

1. A pressure sensor comprising:
a sensor chip configured to sense a pressure of a fluid and generate an electrical signal representative of the sensed pressure, said sensor chip having a surface that includes a sensing area to be exposed to the fluid and a plurality of electrical contact pads that are disposed on the surface; and
a circuit chip including a circuit that is configured to process the electrical signal generated by said sensor chip said circuit chip having a plurality of electrical contact pads that are disposed on a surface of said circuit chip and respectively electrically connected to the electrical contact pads of said sensor chip,
wherein the surfaces of said sensor chip and said circuit chip face each other with a space formed therebetween,
the sensing area of the surface of said sensor chip is to be directly exposed to the fluid which flows into the space between the surfaces of said sensor chip and said circuit chip, and
all the electrical contact pads of said sensor chip and said circuit chip are interposed between the surfaces of said sensor chip and said circuit chip and hermetically sealed so as to be isolated from the fluid.

2. The pressure sensor as set forth in claim 1, further comprising a substrate that includes a resin sheet having an opening formed therethrough and a plurality of electrical conductors arranged within the resin sheet, wherein said substrate is joined to both said senor chip and said circuit chip so that said substrate is interposed between the surfaces of said sensor chip and said circuit chip, and the sensing area of the surface of said sensor chip is to be exposed to the fluid through the opening of the resin sheet of said substrate, and wherein the electrical contact pads of said circuit chip are respectively electrically connected to those of said sensor chip through the electrical conductors of said substrate, and all the electrical contact pads of said circuit chip and said sensor chip and the electrical conductors of said substrate are hermetically sealed within the resin sheet of said substrate so as to be isolated from the fluid.

3. The pressure sensor as set forth in claim 2, wherein the resin sheet of said substrate further has a plurality of via holes formed therein, and wherein the electrical contact pads of said sensor chip and said circuit chip are respectively electrically connected to the electrical conductors of said substrate through the via holes.

4. The pressure sensor as set forth in claim 3, wherein the resin sheet of said substrate has thermoplasticity.

5. The pressure sensor as set forth in claim 4, wherein said substrate is joined to both said senor chip and said circuit chip by thermal press fitting.

6. The pressure sensor as set forth in claim 2, wherein the resin sheet of said substrate has thermoplasticity.

7. The pressure sensor as set forth in claim 6, wherein said substrate is joined to both said senor chip and said circuit chip by thermal press fitting.

8. The pressure sensor as set forth in claim 2, wherein the fluid, the pressure of which is to be sensed by the pressure sensor, is an exhaust gas from an engine.

9. The pressure sensor as set forth in claim 8, wherein the pressure sensor is configured to be operable in an environment where exposed to condensed water around the engine, the condensed water having a pH of 4 or less.

10. The pressure sensor as set forth in claim 1, wherein the electrical contact pads of said circuit chip are respectively joined and electrically connected to those of said sensor chip through an anisotropic conductive adhesive, and wherein all the electrical contact pads of said circuit chip and said sensor chip are hermetically sealed with an insulative adhesive so as to be isolated from the fluid, leaving the sensing area of the surface of said sensor chip to be exposed to the fluid.

11. The pressure sensor as set forth in claim 10, wherein the fluid, the pressure of which is to be sensed by the pressure sensor, is an exhaust gas from an engine.

12. The pressure sensor as set forth in claim 11, wherein the pressure sensor is configured to be used in an environment where exposed to condensed water around the engine, the condensed water having a pH of 4 or less.

* * * * *